US009424676B2

United States Patent
Chen et al.

(10) Patent No.: US 9,424,676 B2
(45) Date of Patent: *Aug. 23, 2016

(54) TRANSITIONING BETWEEN TOP-DOWN MAPS AND LOCAL NAVIGATION OF RECONSTRUCTED 3-D SCENES

(71) Applicant: Microsoft Technology Licensing, LLC, Redmond, WA (US)

(72) Inventors: Billy Chen, Bellevue, WA (US); Eyal Ofek, Redmond, WA (US); David Maxwell Gedye, Seattle, WA (US); Jonathan Robert Dughi, Bainbridge Island, WA (US); Mark Ruane Dawson, Seattle, WA (US); Joshua Podolak, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/102,127

(22) Filed: Dec. 10, 2013

(65) Prior Publication Data

US 2014/0098107 A1 Apr. 10, 2014

Related U.S. Application Data

(63) Continuation of application No. 12/699,896, filed on Feb. 4, 2010, now Pat. No. 8,624,902.

(51) Int. Cl.
*G06T 13/20* (2011.01)
*G06T 7/00* (2006.01)

(52) U.S. Cl.
CPC ............... *G06T 13/20* (2013.01); *G06T 7/0022* (2013.01)

(58) Field of Classification Search
None
See application file for complete search history.

(56) References Cited

U.S. PATENT DOCUMENTS 6,212,420 B1 4/2001 Wang et al.
6,324,469 B1 11/2001 Okude et al.
(Continued)

FOREIGN PATENT DOCUMENTS

WO WO 2009089125 7/2009

OTHER PUBLICATIONS

Hachet et al. "3D Panorama Service on Mobile Device for Hiking," Apr. 28-May 3, 2007, Retrieved at<<http://msLftw.aUpapers/6_hachet.pdf>>, CHI Workshop 2007, San Jose, USA, pp. 1-4.

(Continued)

*Primary Examiner* — Said Broome
(74) *Attorney, Agent, or Firm* — Steven J. Spellman; Tom Wong; Micky Minhas (57) ABSTRACT

Technologies are described herein for transitioning between a top-down map display of a reconstructed structure within a 3-D scene and an associated local-navigation display. An application transitions between the top-down map display and the local-navigation display by animating a view in a display window over a period of time while interpolating camera parameters from values representing a starting camera view to values representing an ending camera view. In one embodiment, the starting camera view is the top-down map display view and the ending camera view is the camera view associated with a target photograph. In another embodiment, the starting camera view is the camera view associated with a currently-viewed photograph in the local-navigation display and the ending camera view is the top-down map display.

20 Claims, 7 Drawing Sheets

(56) References Cited

U.S. PATENT DOCUMENTS

| | | | |
|---|---|---|---|
| 6,571,024 B1 | 5/2003 | Sawhney et al. | |
| 6,619,406 B1 | 9/2003 | Kacyra et al. | |
| 6,639,594 B2 | 10/2003 | Zhang et al. | |
| 6,760,027 B2 | 7/2004 | Endo et al. | |
| 7,148,892 B2 | 12/2006 | Robertson et al. | |
| 7,386,394 B2 | 6/2008 | Shulman | |
| 8,488,877 B1* | 7/2013 | Owechko et al. | 382/165 |
| 2002/0076085 A1 | 6/2002 | Shimazu | |
| 2004/0085335 A1 | 5/2004 | Burlnyk et al. | |
| 2004/0125138 A1 | 7/2004 | Jetha | |
| 2005/0134945 A1 | 6/2005 | Gallagher | |
| 2005/0156945 A1 | 7/2005 | Asami | |
| 2006/0132482 A1 | 6/2006 | Oh | |
| 2008/0221843 A1 | 9/2008 | Shenkar et al. | |
| 2008/0222558 A1 | 9/2008 | Cho et al. | |
| 2008/0246759 A1 | 10/2008 | Summers | |
| 2008/0247636 A1 | 10/2008 | Davis et al. | |
| 2008/0268876 A1 | 10/2008 | Gelfand et al. | |
| 2008/0291217 A1 | 11/2008 | Vincent et al. | |
| 2009/0002394 A1 | 1/2009 | Chen et al. | |
| 2009/0185741 A1* | 7/2009 | Nahari et al. | 382/154 |
| 2009/0237510 A1 | 9/2009 | Chen et al. | |
| 2011/0187704 A1 | 8/2011 | Chen et al. | |
| 2011/0187716 A1 | 8/2011 | Chen et al. | |
| 2011/0187723 A1 | 8/2011 | Chen et al. | |

OTHER PUBLICATIONS

Hogue et al. "Underwater Environment Reconstruction using Stereo and Inertial Data", Oct. 7-10, 2007, IEEE International Conference on Systems, Man and Cybernetics, 6 pp.

Kang et al. "Smooth Scene Transition for Virtual Tour on the World Wide Web", 2005, IEEE Proceedings of the Sixth International Conference on Computational Intelligence and Multimedia Applications (ICCIMA '05), 6 pp.

Koch et al. "3D Reconstruction and Rendering from Image Sequences", 2005, WIAMIS 05, Retrieved at http://www.ist-matris.org/ publications/WIAMIS-Reconstruction.pdf, pp. 4.

Matsumoto, et al. "Visual Navigation Using Omnidirectional View Sequence", 1999 IEEE Proceedings of the 1999 IEEVRSJ International Conference on Intelligent Robots and Systems, , pp. 317-322.

Oskam, et al. "Visibility Transition Planning for Dynamic Camera Control", 2009, Eurographics/ACM SIGGRAPH Symposium on Computer Animation (2009), pp. 47-57.

Sudarsanam et al. "Non-linear Perspectives Widgets for Creating Multiple-View Images", Retrieved at http://www.cs.wustl.edu/-cmg/contentlpapers/npar2008np/npar2008np.pdf, 9 pp.

Terzopoulos, et al. "Dynamic 3D Models with Local and Global Deformations: Deformable Superquadrics", Jul. 1991, IEEE Transactions on Pattern Analysis and Machine Intelligence, vol. 13, No. 7, pp. 703-714.

Wulf, et al. "Colored 2D Maps for Robot Navigation with 3D Sensor Data", Sep. 28-Oct. 2, 2004, IEEE/RSJ International Conference on Intelligent Robots and Systems, 6 pp.

Wulf, et al. "2D Mapping of Cluttered Indoor Environments by Means of 3D Perception," Apr. 2004, Proceedings of the 2004 IEEE International Conference on Robotics & Automation, New Orleans, LA, pp. 4204-4209.

Zitnick et al. "High-Quality Video View Interpolation Using a Layered Representation", Aug. 2004, Proceedings of ACM SIGGRAPH 2004, 23(3): 600-608.

U.S. Official Action dated Jun. 21, 2012 in U.S. Appl. No. 12/699,902.

U.S. Official Action dated Dec. 14, 2012 in U.S. Appl. No. 12/699,902.

U.S. Official Action dated Apr. 5, 2013 in U.S. Appl. No. 12/699,902.

U.S. Official Action dated Sep. 18, 2013 in U.S. Appl. No. 12/699,902.

U.S. Official Action dated Jun. 22, 2012 in U.S. Appl. No. 12/699,904.

U.S. Official Action dated Dec. 12, 2012 in U.S. Appl. No. 12/699,904.

U.S. Official Action dated Apr. 15, 2013 in U.S. Appl. No. 12/699,904.

U.S. Official Action dated Sep. 23, 2012 in U.S. Appl. No. 12/699,904.

U.S. Official Action dated Sep. 19, 2012 in U.S. Appl. No. 12/699,896.

U.S. Official Action dated Mar. 12, 2013 in U.S. Appl. No. 12/699,896.

U.S. Notice of Allowance dated Aug. 19, 2013 in U.S. Appl. No. 12/699,896.

"Genesis IV Tutorial: Getting Started—The Main Window," Oct. 5, 2009, Retrieved from http://www.geomantics.com/tutorial01.htm, 1 pp.

Chen et al., "A Virtual Environment System for the Comparison of Dome and HMD Systems", 2003, Proceedings of the International Conference on Computer Graphics and Spatial Information Systems, pp. 50-58.

U.S. Official Action dated Jan. 17, 2014 in U.S. Appl. No. 12/699,902.

U.S. Notice of Allowance dated Mar. 14, 2014 in U.S. Appl. No. 12/699,904.

U.S. Official Action dated Jul. 11, 2014 in U.S. Appl. No. 12/699,902.

* cited by examiner

TRANSITIONING BETWEEN TOP-DOWN MAPS AND LOCAL NAVIGATION OF RECONSTRUCTED 3-D SCENES

CROSS REFERENCE TO RELATED APPLICATIONS

This application is a continuation of U.S. patent application Ser. No. 12/699,896 filed Feb. 4, 2010, now U.S. Pat. No. 8,624,902, entitled "Transitioning Between a Top-Down Map Display and a Local Navigation Display of Reconstructed 3-D Scenes," which is incorporated herein by reference in its entirely.

BACKGROUND

Using the processing power of computers, it is possible to create a visual reconstruction of a scene or structure from a collection of digital photographs ("photographs") of the scene. The reconstruction may consist of the various perspectives provided by the photographs coupled with a group of three-dimensional ("3-D") points computed from the photographs. The 3-D points may be computed by locating common features, such as objects or edges, in a number of the photographs, and using the position, perspective, and visibility or obscurity of the features in each photograph to determine a 3-D position of the feature. The visualization of 3-D points computed for the collection of photographs is referred to as a "3-D point cloud." For example, given a collection of photographs of a cathedral from several points of view, a 3-D point cloud may be computed that represents the cathedral's geometry. The 3-D point cloud may be utilized to enhance the visualization of the cathedral's structure when viewing the various photographs in the collection.

Current applications may allow a user to navigate a visual reconstruction by moving from one photograph to nearby photographs within the view. For example, to move to a nearby photograph, the user may select a highlighted outline or "quad" representing the nearby photograph within the view. This may result in the view of the scene and accompanying structures being changed to the perspective of the camera position, or "pose," corresponding to the selected photograph in reference to the 3-D point cloud. This form of navigation is referred to as "local navigation."

Local navigation, however, may be challenging for a user. First, photographs that are not locally accessible or shown as a quad within the view may be difficult to discover. Second, after exploring a reconstruction, the user may not retain an understanding of the environment or spatial context of the captured scene. For example, the user may not appreciate the size of a structure captured in the reconstruction or have a sense of which aspects of the overall scene have been explored. Furthermore, since the photographs likely do not sample the scene at a regular rate, a local navigation from one photograph to the next may result in a small spatial move or a large one, with the difference not being easily discernable by the user. This ambiguity may further reduce the ability of the user to track the global position and orientation of the current view of the reconstruction.

It is with respect to these considerations and others that the disclosure made herein is presented.

SUMMARY

Technologies are described herein for transitioning between a top-down map display of a reconstructed structure within a 3-D scene and an associated local-navigation display. In a display of a visual reconstruction of the 3-D scene, a user may utilize the top-down map display as an alternative means of navigating the photographs within the reconstruction, enhancing the user's understanding of the environment and spatial context of the scene while improving the discoverability of photographs not easily discovered through local navigation. If the user selects a camera pose, object, point, or other element of the reconstruction on the top-down map display, the display may be transitioned to the local-navigation display showing a representative photograph based on the selected element. Utilizing the technologies described herein, this transition may be performed in such way as to preserve the continuity between the top-down map display and the local-navigation display without causing confusing or visually unpleasant effects like camera spiral or vertigo.

According to embodiments, an application transitions between the top-down map display and the local-navigation display by animating a view in a display window over a period of time while interpolating camera parameters from values representing a starting camera view to values representing an ending camera view. In one embodiment, the starting camera view is the top-down map display view and the ending camera view is the camera view associated with a target photograph. In another embodiment, the starting camera view is the camera view associated with a currently-viewed photograph in the local-navigation display and the ending camera view is the top-down map display. In yet another embodiment, the starting camera view is the camera view associated with a currently-viewed photograph in the local-navigation display and the ending camera view is the camera view associated with another photograph within the reconstruction, with the animation moving from the starting camera view to the top-down map display view and then from the top-down map display view to the ending camera view.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for transitioning between a top-down map display of a reconstructed structure within a 3-D scene and an associated local-navigation display. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
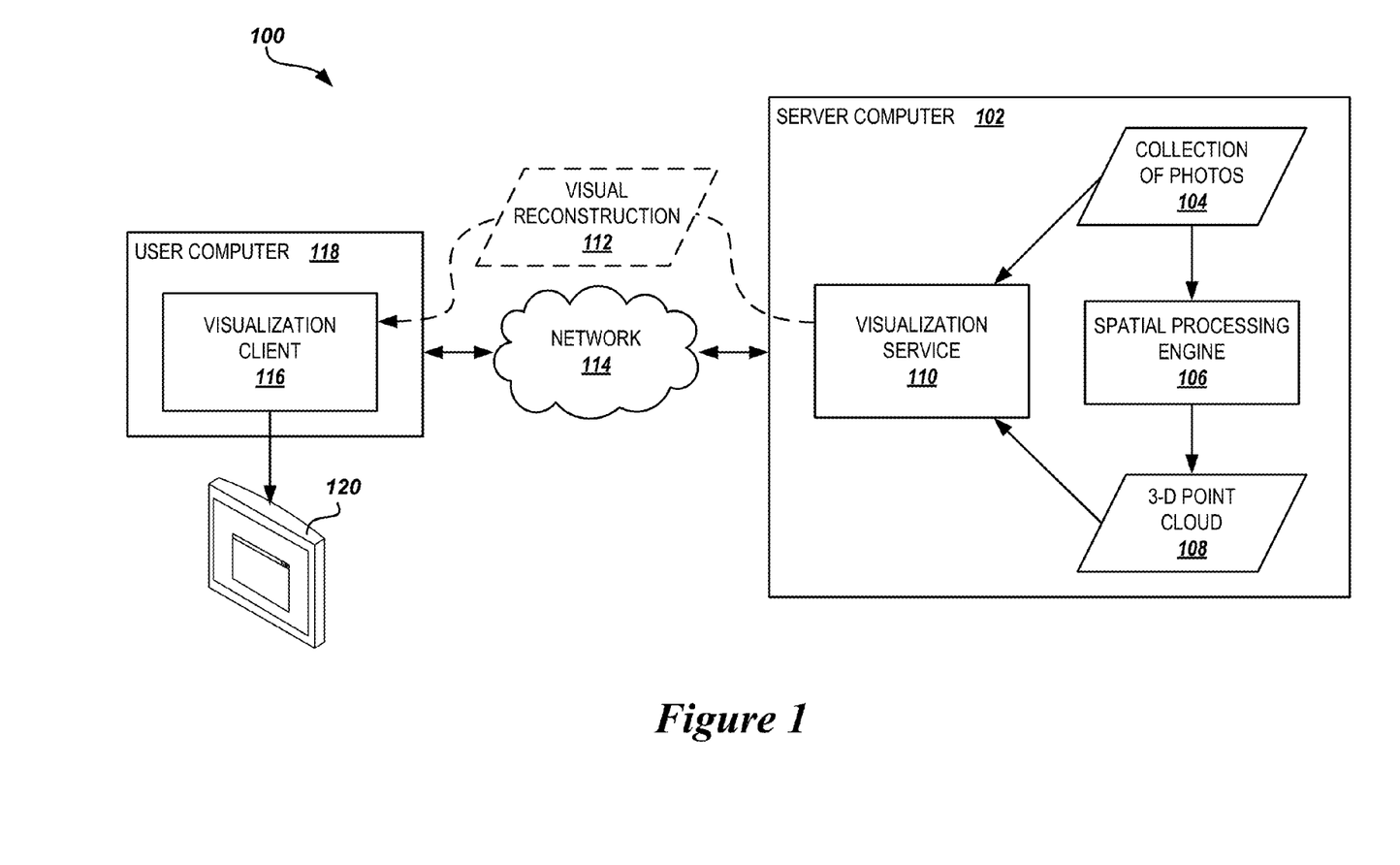
FIG. 1 is a block diagram showing aspects of an illustrative operating environment and several software components provided by the embodiments presented herein.

FIG. 1 shows an illustrative operating environment 100 including several software components for transitioning between a top-down map display of a reconstructed structure within a 3-D scene and an associated local navigation display, according to embodiments provided herein. The environment 100 includes a server computer 102. The server computer 102 shown in FIG. 1 may represent one or more web servers, application servers, network appliances, dedicated computer hardware devices, personal computers ("PC"), or any combination of these and/or other computing devices known in the art.

According to one embodiment, the server computer 102 stores a collection of photographs 104. The collection of photographs 104 may consist of two or more digital photographs taken by a user of a particular structure or scene, or the collection of photographs may be an aggregation of several digital photographs taken by multiple photographers of the same scene, for example. The digital photographs in the collection of photographs 104 may be acquired using digital cameras, may be digitized from photographs taken with traditional film-based cameras, or may be a combination of both.

A spatial processing engine 106 executes on the server computer 102 and is responsible for computing a 3-D point cloud 108 representing the structure or scene from the collection of photographs 104. The spatial processing engine 106 may compute the 3-D point cloud 108 by locating recognizable features, such as objects or textures, that appear in two or more photographs in the collection of photographs 104, and calculating the position of the feature in space using the location, perspective, and visibility or obscurity of the features in each photograph. The spatial processing engine 106 may be implemented as hardware, software, or a combination of the two, and may include a number of application program modules and other components on the server computer 102.

A visualization service 110 executes on the server computer 102 that provides services for users to view and navigate visual reconstructions of the scene or structure captured in the collection of photographs 104. The visualization service 110 may be implemented as hardware, software, or a combination of the two, and may include a number of application program modules and other components on the server computer 102.

The visualization service 110 utilizes the collection of photographs 104 and the computed 3-D point cloud 108 to create a visual reconstruction 112 of the scene or structure, and serves the reconstruction over a network 114 to a visualization client 116 executing on a user computer 118. The user computer 118 may be a PC, a desktop workstation, a laptop, a notebook, a mobile device, a personal digital assistant ("PDA"), an application server, a Web server hosting Web-based application programs, or any other computing device. The network 114 may be a local-area network ("LAN"), a wide-area network ("WAN"), the Internet, or any other networking topology that connects the user computer 118 to the server computer 102. It will be appreciated that the server computer 102 and user computer 118 shown in FIG. 1 may represent the same computing device.

The visualization client 116 receives the visual reconstruction 112 from the visualization service 110 and displays the visual reconstruction to a user of the user computer 118 using a display device 120 attached to the computer. The visualization client 116 may be implemented as hardware, software, or a combination of the two, and may include a number of application program modules and other components on the user computer 118. In one embodiment, the visualization client 116 consists of a web browser application and a plug-in module that allows the user of the user computer 118 to view and navigate the visual reconstruction 112 served by the visualization service 110.

Figure 2:
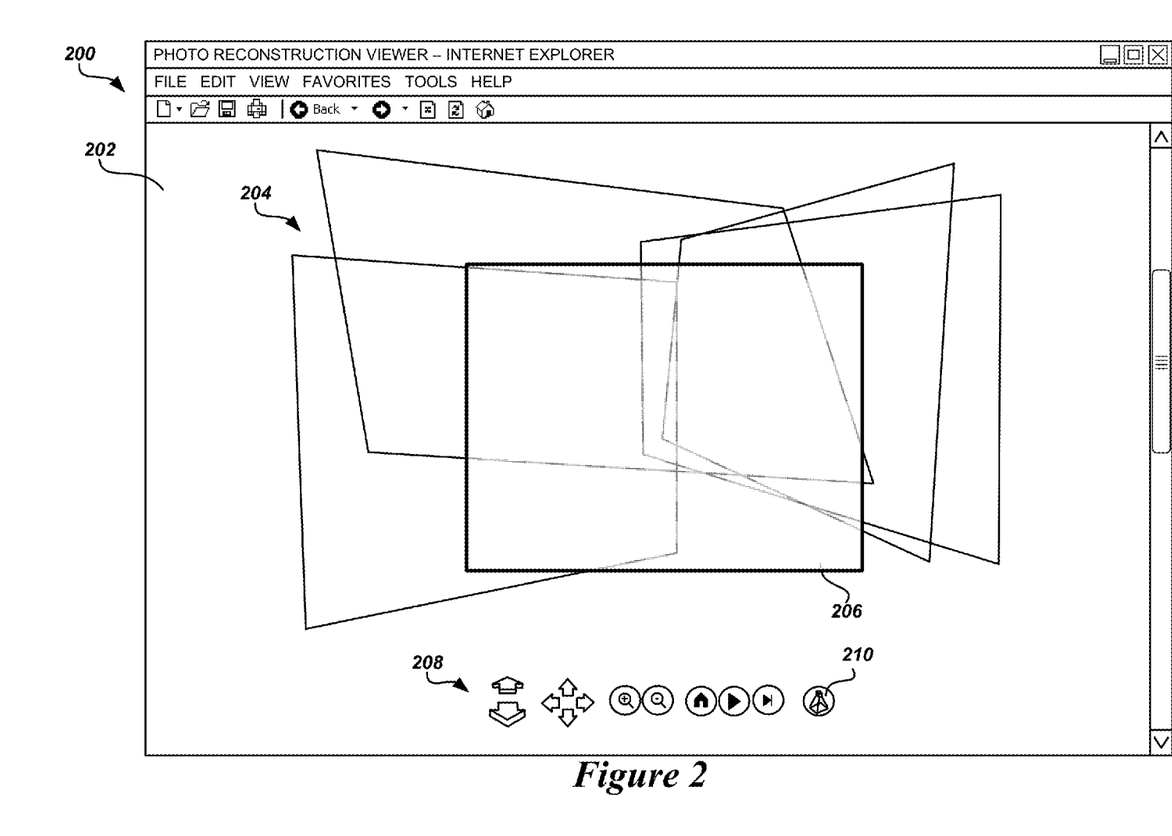
FIG. 2 is a display diagram showing an illustrative user interface for displaying a local-navigation display of a visual reconstruction, according to embodiments presented herein.

FIG. 2 shows an example of an illustrative user interface 200 displayed by the visualization client 116 allowing a user to locally navigate the photographs in the visual reconstruction 112. The user interface 200 includes a window 202 in which a local-navigation display 204 is displayed. The local-navigation display 204 shows a currently-viewed photograph 206 from the photographs in the visual reconstruction 112. The local-navigation display 204 may show the currently-viewed photograph 206 in relation to other photographs and the 3-D point cloud that make-up the visual reconstruction 112. The visualization client 116 may provide a set of navigation controls 208 that allows the user to pan and zoom the currently-viewed photograph 206 in the local-navigation display 204, as well as move between the photographs of the visual reconstruction 112. The set of navigation controls 208 may further contain a particular control 210 to change the display to a top-down map display, as described below.

According to embodiments, the visual reconstruction 112 includes a top-down map display. Generally, the top-down map display is a two-dimensional view of the 3-D scene from the top. In one embodiment, the top-down map display is generated by projecting all the points of the 3-D point cloud 108 into the x-y plane. The positions of the identifiable features, or points, computed in the 3-D point cloud 108 may be represented as dots in the top-down map display. The points of the 3-D point cloud 108 shown in the top-down map display may be filtered and/or enhanced to reduce the noise and enhance the top-down visualization, as described in co-pending U.S. patent application Ser. No. 12/699,902 filed concurrently herewith, and entitled "Generating and Displaying Top-Down Maps of Reconstructed 3-D Scenes," which is incorporated herein by reference in its entirety.

In other embodiments, the top-down map display may be a photograph or image of the scene from above, a top view of a 3-D model of the scene, or some other two-dimensional representation of the 3-D scene. Further, the top-down map display may be projected onto a reference plane other than the x-y plane. For example, in a visual reconstruction 112 of a cathedral with a large amount of detail on the façade, the plane of the façade may serve as the reference plane for the top-down map display. In addition, a non-planar reference surface may be utilized. For example, in a visual reconstruction 112 of the interior of a room, a cylinder centered at the center of the room may be utilized as the reference surface, with the details of the room's walls projected onto the cylindrical surface.

Figure 3:
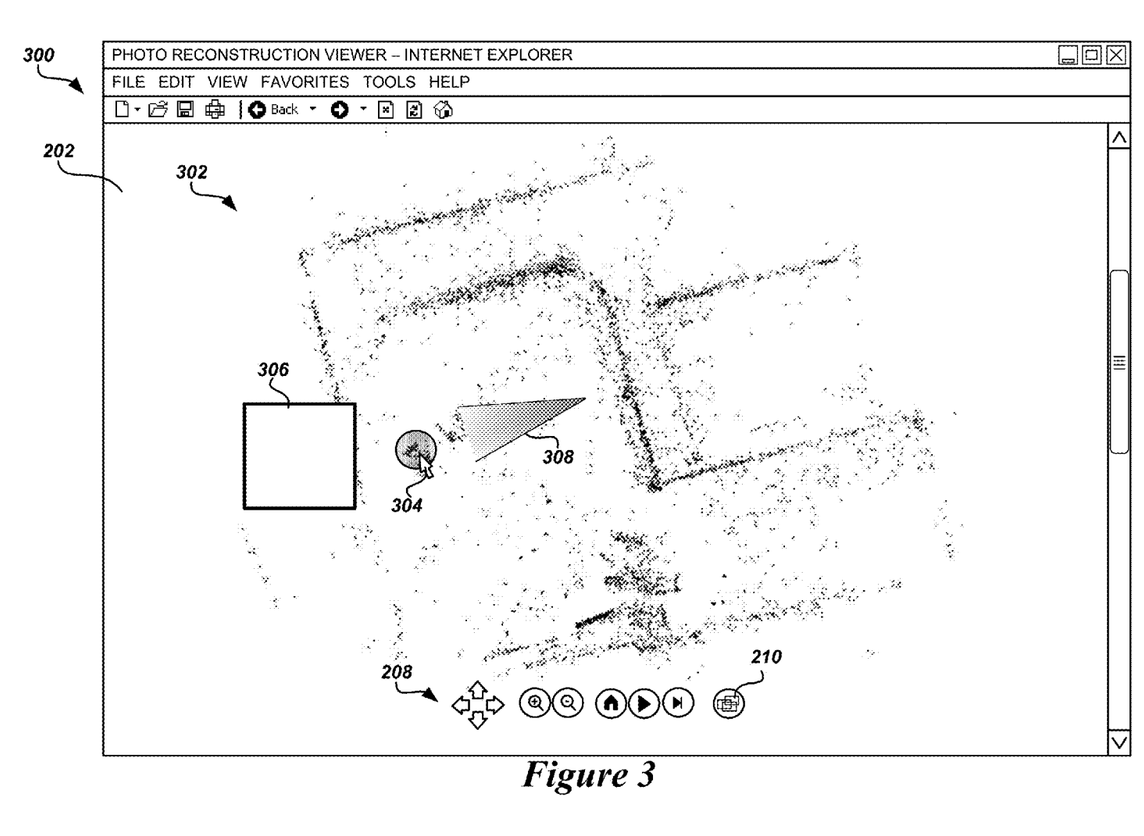
FIG. 3 is a display diagram showing an illustrative user interface for displaying a top-down map display of the visual reconstruction, according to embodiments presented herein.

FIG. 3 shows an illustrative user interface 300 provided by the visualization client 116 for displaying a top-down map display 302 generated from the 3-D point cloud 108, as described above. In this example, the top-down map display 302 is displayed separately from the local-navigation display 204. This view is referred to as the "modal view." The visualization client 116 may provide a similar set of navigation controls 208 as those described above that allows the user to pan and zoom the top-down map display 302 to reveal the entire scene or structure represented in the visual reconstruction 112, or to see more detail of a particular section. The user may toggle back and forth between the display of the top-down map display 302 and the local-navigation display 204 using the particular control 210 in the set of navigation controls 208, for example.

The visualization client 116 may further provide a number of techniques allowing the user to interact with the top-down map display 302, as described in co-pending U.S. patent application Ser. No. 12/699,904 filed concurrently herewith, and entitled "User Interfaces for Interacting with Top-Down Maps of Reconstructed 3-D Scenes," which is incorporated herein by reference in its entirety. These interactions may include the user selecting camera poses, objects, points, or other elements of the visual reconstruction 112 on the top-down map display 302 in order to view associated representative photographs in the local-navigation display 204. For example, the user interface 300 may include a selection control 304 that allows the user to select a point or group of points on the top-down map display 302. The selection control 304 may be a pointer, circle, square, or other iconic indicator that the user may move around the map using a mouse or other input device connected to the user computer 118.

According to one embodiment, if the user hovers the selection control 304 over a point on the top-down map display 302, the visualization client 116 may display a thumbnail image 306 of a representative photograph at an appropriate position on the corresponding map. In addition to the thumbnail image 306, the visualization client 116 may further display a view frustum 308 or other indicator on the top-down map display 302 that indicates the position and point-of-view of the camera that captured the representative photograph. Further, if the user selects the point under the selection control 304, by clicking a button on the mouse, for example, the visualization client 116 may transition the display in the window 202 to the local-navigation display 204 showing the representative photograph.

Both the local-navigation display 204 and the top-down map display 302 inform the user about the reconstructed 3D scene. In the local-navigation display 204, the main benefit is visualization of local details. A user may zoom into the currently-viewed photograph 206 in the local-navigation display 204 to appreciate the finer details of the subject. In contrast, the top-down map display 302 provides a global context of the 3-D scene, providing the user with an understanding of the environment in which the photographs were taken. Connecting the context of the top-down map display 302 to the details of the local-navigation display 204 is important because it enables the user to better explore the 3D scene.

In order to preserve the spatial connection between the top-down map display 302 and the local-navigation display 204, the visualization client 116 may employ a number of techniques to transition between the displays. In the simplest approach, the visualization client 116 toggles instantly between the two displays. However, this approach lacks any continuity between the views and the spatial connection is lost. In another approach, the visualization client 116 fades between the two displays, taking advantage of the user's ability to retain a temporary visual imprint. This approach is only successful in retaining continuity between the views, however, when the top-down map display 302 and the local-navigation display 204 have related orientations. For example, if the currently-viewed photograph 206 in the local-navigation display 204 was taken from the top of a mountain looking down into a valley, then a fade to a top-down map display 302 of the same valley oriented in a "camera-up" direction may be adequate. If, instead, the currently-viewed photograph 206 was taken in the valley of a store façade, for example, then a fade to a top-down map display 302 of the valley may be discontinuous.

Alternatively, the visualization client 116 may transition between the top-down map display 302 and the local-navigation display 204 by animating a smooth interpolation between the views, according to the embodiments described herein. Further, these transitions may be performed in such a way as to preserve the continuity between the two views without causing confusing or visually unpleasant effects like camera spiral or vertigo. Both the top-down map display 302 display and the local-navigation display 204 can be expressed in terms of a "camera view." Generally, the camera view may comprise a set of seven parameters, grouped into 3 categories: position (x, y, z), orientation (pitch, yaw, roll), and field-of-view. Together, these parameters define the top-down map display 302 and local-navigation display 204 views and how they are rendered by the visualization client 116 in the window 202. The camera view for the local-navigation display 204 is typically defined by the position and orientation of the camera that took the currently-viewed photograph 206, while the top-down map display 302 camera view is typically positioned high above the 3-D scene, pointed downward with a small field-of-view.

According to embodiments, to perform the animated transition from one display to the other, the visualization client 116 interpolates the parameters between the starting camera view and the ending camera view. In one embodiment, the visualization client 116 linearly interpolates between the start values and end values of the parameters over the time of the transition. For example, the visualization client may employ a formula such as:

$$P(t) = (1-t)*S + t*E$$

where P(t) is the value of the parameter at time t, t having a value between 0 and 1, S is the start value of the parameter, and E is the end value of the parameter. The linear interpolation provides a constant acceleration, however, which may not provide the most intuitive transition.

To achieve a smoother result, the visualization client 116 employs a sigmoid function to perform the interpolations, according to another embodiment. A sigmoid function is defined as:

$$F(t) = \frac{1}{1+e^{-t}}$$

Figure 9:
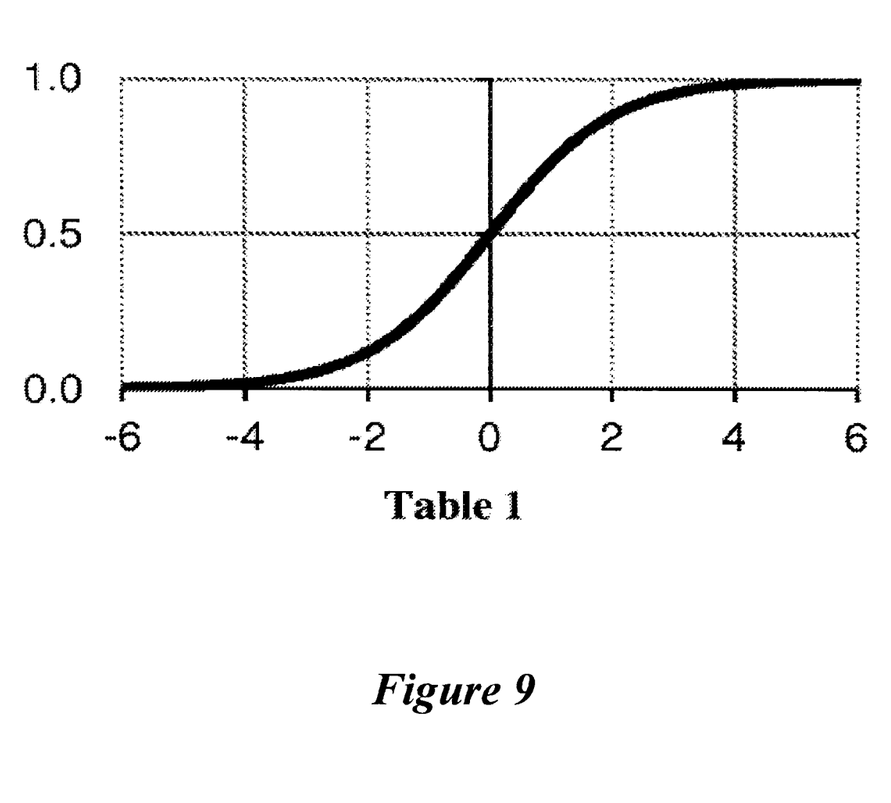
FIG. 9 illustrates Table 1 representing a sigmoid function producing an "S-curve."

This function produces an "S-curve," such as that shown in Table 1 of FIG. 9. Utilizing the sigmoid function allows the animation of the transition between the views to initially progress slowly, accelerate to a maximum at the center, and decelerate at the end.

The simplicity and smoothness properties of the S-curve make it ideal for user interactions when smooth motion is required. Integrating the sigmoid function into the interpolation function yields:

$$P(t) = (1-F(t))*S + F(t)*E$$

The visualization client 116 may utilize such a function to perform the interpolations of the parameters for the transition between the camera views. It will be appreciated that the visualization client 116 may utilize a combination of both the linear and sigmoid-based interpolation functions described above, or it may utilize any general function known in the art for interpolating the parameters for the transition between the views, as described below.

Figure 4:
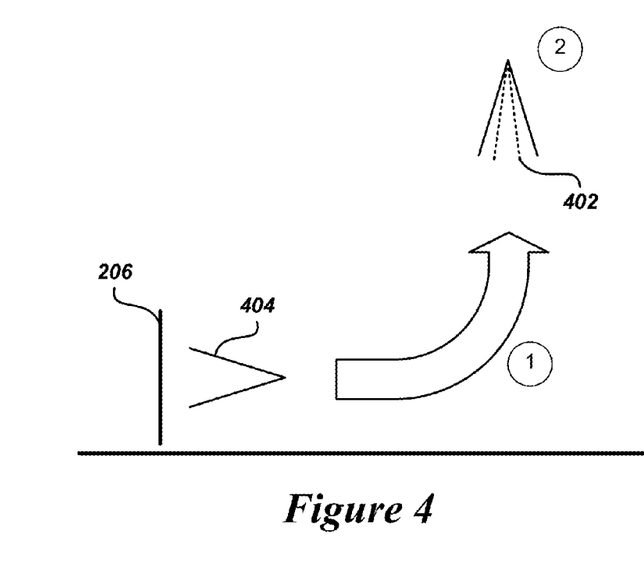
FIG. 4 is a diagram showing aspects of one technique for transitioning from the local-navigation display to the top-down map display, according to embodiments presented herein.

FIG. 4 illustrates one method of transitioning the display from the local-navigation display 204 to the top-down map display 302 utilizing the interpolation techniques described above, according to one embodiment. This transition may be performed when the user selects the specific control 210 in the set of navigation controls 208 to toggle the display from the local-navigation display 204 to the top-down map display 302, for example. In one embodiment, the visualization client 116 may perform the transition between the local-navigation display 204 and the top-down map display 302 in stages, in order to reduce confusing or visually unpleasant effects like camera spiral or vertigo. It will be appreciated that the transition between stages may be performed in a smooth fashion as to position and speed, such that a user may not notice that the overall motion is composed of separate stages. The transition from local-navigation display 204 to the top-down map display 302 may occur in two stages: 1) transition the position and pitch of the camera view to that of the top-down map display, and 2) transition the field-of-view.

As shown in FIG. 4, in the first stage, the camera view transitions from the starting camera view 402 of the currently-viewed photograph 206 to a position high above the 3D scene, and is pointed downward. Adjusting the pitch enables the camera view to point downward. Note that the camera view does not transition into the last viewed orientation (roll) of the top-down map display 302 display. Instead, the transition results in a "camera-up" orientation of the top-down map display 302 in respect to the currently-viewed photograph 206. This results in a transition without spiral effect as the camera transitions through the first stage.

Once the camera view is positioned and oriented, the second stage transitions the field-of-view from that of the currently-viewed photograph 206 to that of the ending camera view 404 of the top-down map display 302. Typically, the top-down map display's field-of-view is small, e.g. about 1 degree, creating a near-orthographic projection. The local-navigation display 204, however, may have a more typical photographic field-of-view, such as 45 degrees. The visual effect of transitioning between these two fields-of-view is that walls and vertical structures visualized in the top-down map display 302 will appear to bend inward until they become lines.

One reason for separating the transition of the position and orientation of the camera view from the transition of the field-of-view is that the combination of the two transitions could produce unwanted visual effects. For example, adjusting the position and pitch of the camera view while adjusting the field-of-view could result in vertigo, or the 3D scene may appear to throb back and forth if the field-of-view shrinks more rapidly than the movement of the camera view 402. In addition, if the field-of-view decreases rapidly, the camera view 402 approach a near-orthographic projection before completion of the camera movement, resulting in a loss of all perspective cues, referred to as "foreshortening."

Figure 5:
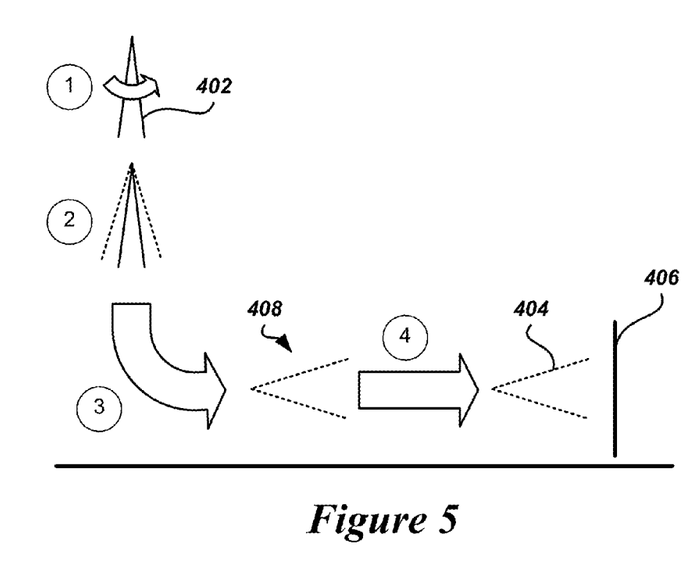
FIG. 5 is a diagram showing aspects of one technique for transitioning from the top-down map display to the local-navigation display, according to embodiments presented herein.

FIG. 5 illustrates one method of transitioning from the top-down map display 302 display to a target photograph 406 in the local-navigation display 204, according to another embodiment. This transition may be performed when the user selects a point or group of points on the top-down map display 302 in order to view a corresponding representative photograph containing the points in the local-navigation display 204, for example. Similar to the method described above in regard to FIG. 4, the transition from top-down map display 302 to local-navigation display 204 may occur in stages to avoid spiraling, vertigo, and non-perspective effects. Specifically, the transition may occur in four stages: 1) rotate the top-down map display view, 2) transition the field-of-view, 3) transition the position and pitch of the camera view from high above the scene to ground level, and 4) approach the ending camera view 404 of the target photograph 406 on the ground level.

As shown in FIG. 5, in the first stage, the top-down map display 302 is rotated to a camera-up orientation for the map in respect to the target photograph 406 by adjusting the roll parameter of the starting camera view 402. This avoids any spiraling effects during the transition since the remaining stages only require the camera to "swoop" downward in a straightforward manner. In the second stage, the field-of-view transitions from the starting camera view 402 to that of the target photograph 406. Decoupling the field-of-view transition from any position or orientation transitions may remove visually unpleasant effects due to vertigo and throbbing, as described above.

In the third stage, the position of the camera view is transitioned from high above the top-down map display 302 to an interim camera position 408 approximately at ground level while adjusting the pitch to that of the target photograph 406. This provides the effect of the camera flying down to ground level at a position slightly behind the ending camera view 404 of the target photograph 406. In the last stage, the position of the camera view is transitioned from the interim camera position 408 so that the camera approaches the ending camera view 404 for the target photograph 406 in local-navigation display 204. To avoid visual artifacts that may occur from neighboring photos in the local-navigation display 204, only the target photograph 406 may be displayed initially as the transition is still distant from the ending camera view 404 position and orientation. As the transition approaches the target photograph 406, however, neighboring photos may be faded-in.

It is possible that before the transition between the displays, the user may have changed the zoom level of the starting camera view. For example, the user may have zoomed-in to the currently-viewed photograph 206 in the local-navigation display 204 to examine more detail, or zoomed-out of the top-down map display 302 display to get a bigger picture of the 3-D scene. In either case, the zooming can cause problems with the transition because the context may be lost. There are two options for transitions in this case: perform the transition starting from the zoomed view, or first transition to a canonical view, then transition into the target view. In the former option, the transition is fast, but if the 3-D scene is sparse (e.g. a sparse 3D point cloud), then the user may lose context in the transition. In the latter option, the disadvantage is that there is an added transition to the canonical view, but the transitions between the views remains consistent and context may be maintained.

It will be appreciated that the transitions from the top-down map display 302 display to the local-navigation display 204 or from the local-navigation display to the top-down map display may be accomplished in any number of stages performed in any order, beyond that described above in regard to FIGS. 4 and 5. Further the various interpolations of position, orientation, and field-of-view parameters may be performed using linear interpolation functions, sigmoid-based interpolation functions, or any combination of these and other functions known in the art for interpolating the parameters between camera views. It is intended that this application include all such transitional stages and interpolation functions.

According to further embodiments, other transitions beyond the transitions from the top-down map display 302 view to the local-navigation display 204 or from the local-navigation display to the top-down map display 302 may be performed using the same approach as described above. For example, while viewing the currently-viewed photograph 206 in the local-navigation display 204, the user may select another photograph to view from a list of highlighted photographs in the visual reconstruction 112. Further, the selected photograph may be visually distant from the currently-viewed photograph 206 in the 3-D scene, or may not have a discernable visual connection to the currently-viewed photograph.

Simply transitioning the camera view 402 along the ground between the currently-viewed photograph 206 and the target photograph 406 may be confusing. In this case, the visualization client 116 may transition the camera view 402 from that of the currently-viewed photograph 206 in the local-navigation display 204 to the top-down map display 302 using the approach described above in regard to FIG. 4, then transition from the top-down map display to the target photograph 406 in the local-navigation display 204 using the approach described above in FIG. 5. This may provide a smoother transition for long distances while allowing the user to retain a visual relationship between the two photographs and their position in the overall 3-D scene.

Figure 6:
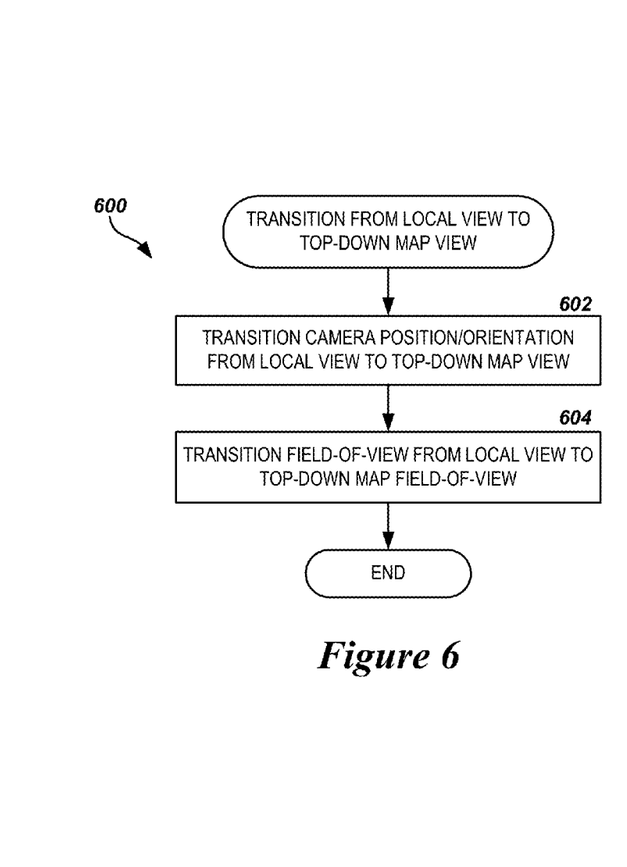
FIG. 6 is a flow diagram showing methods for performing the transition from the local-navigation display to the top-down map display, according to embodiments described herein.
Figure 7:
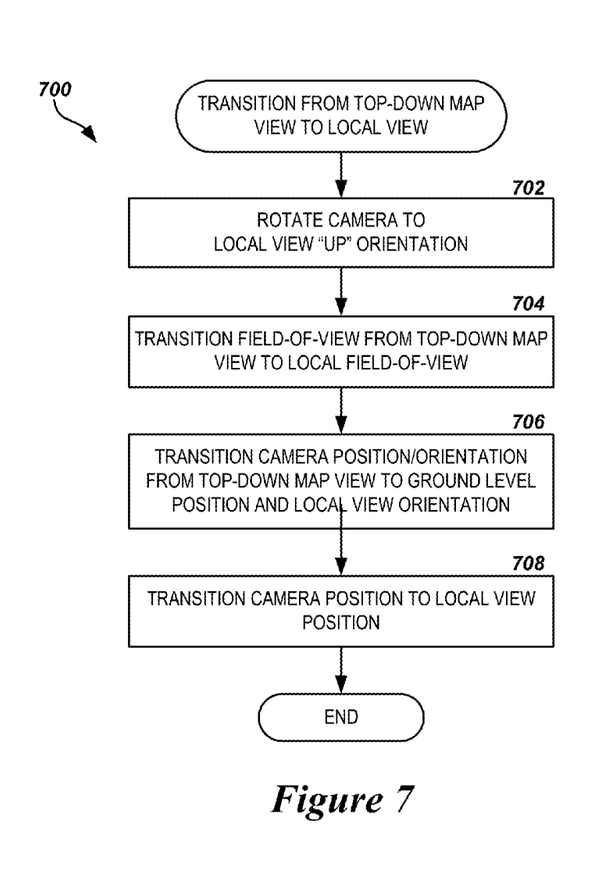
FIG. 7 is a flow diagram showing methods for performing the transition from the top-down map display to the local-navigation display, according to embodiments described herein.

Referring now to FIGS. 6 and 7, additional details will be provided regarding the embodiments presented herein. It should be appreciated that the logical operations described with respect to FIGS. 6 and 7 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 6 illustrates a routine 600 for performing the transition from the local-navigation display 204 to the top-down map display 302, in the manner described above in regard to FIG. 4. According to embodiments, the routine 600 may be performed by the visualization client 116 described above in regard to FIG. 1. It will be appreciated that the routine 600 may also be performed by other modules or components executing on the server computer 102 and/or user computer 118, or by any combination of modules and components.

The routine 600 begins at operation 602, where the visualization client 116 transitions the camera view from the position and orientation of the starting camera view 402 of the currently-viewed photograph 206 in the local-navigation display 204 to high above the 3-D scene looking down at the top-down map display 302. This may be performed by animating the view in the window 202 over a period of time while interpolating between the camera parameters for position and pitch, as described above in regard to stage 1 of FIG. 4. The interpolation of the parameters may be performed using a linear interpolation function, a sigmoid-based interpolation function, or any combination of these and other functions known in the art for interpolating parameters between camera views.

From operation 602, the routine 600 proceeds to operation 604, where the visualization client 116 then adjusts the field-of-view of the camera view 402 to produce the near-orthographic projection of the top-down map display 302, as described above in regard to stage 2 of FIG. 4. This may also be performed by animating the view in the window 202 over a period of time while interpolating the field-of-view parameter between the initial field-of-view and the field-of-view of the ending camera view 404. The visual effect of transitioning between these two fields-of-views is that walls and vertical structures visualized in the top-down map display 302 will appear to bend inward until they become lines. From operation 604, the routine 600 ends.

FIG. 7 illustrates a routine 700 for performing the transition from the top-down map display 302 display to the local-navigation display 204, in the manner described above in regard to FIG. 5. According to embodiments, the routine 700 may be performed by the visualization client 116 described above in regard to FIG. 1. It will be appreciated that the routine 700 may also be performed by other modules or components executing on the server computer 102 and/or user computer 118, or by any combination of modules and components.

The routine 700 begins at operation 702, where the visualization client 116 rotates the starting camera view 402 of the top-down map display 302 to a camera-up orientation in respect to the target photograph 406, as described above in regard to stage 1 of FIG. 5. This may be performed by animating the view in the window 202 over a period of time while interpolating the roll parameter of the camera view for the top-down map display 302. The roll parameter may be interpolated using a linear interpolation function, a sigmoid-based interpolation function, or any combination of these and other functions known in the art for interpolating parameters between camera views.

From operation 702, the routine 700 proceeds to operation 704, where the visualization client 116 adjusts the field-of-view from that of the top-down map display 302 to that of the target photograph 406, as described above in regard to stage 2 of FIG. 5. The routine 700 then proceeds to operation 706, where the visualization client 116 transitions the camera view from the starting camera view 402 high above the 3-D scene to an interim camera position 408 approximately at ground level with the orientation of the target-photograph 406, as described above in regard to stage 3 of FIG. 4. This may be performed by animating the view in the window 202 over a period of time while interpolating between the camera parameters for position, pitch, and roll. The animation provides the effect of the camera flying down to ground level at a position slightly behind the ending camera view 404 of the target photograph 406.

From operation 706, the routine 700 proceeds to operation 708, where the visualization client 116 animates the camera view to approach the ending camera view 404 of the target photograph 406 within the local-navigation display 204, as described above in regard to stage 4 of FIG. 5. This may be performed by animating the view in the window 202 over a period of time while interpolating the camera position parameters using a linear interpolation function, a sigmoid-based interpolation function, or some other function or combination of functions known in the art. As the transition approaches the target photograph 406, the visualization client 116 may further fade-in neighboring photographs in the local-navigation display 204. From operation 708, the routine 700 ends.

Figure 8:
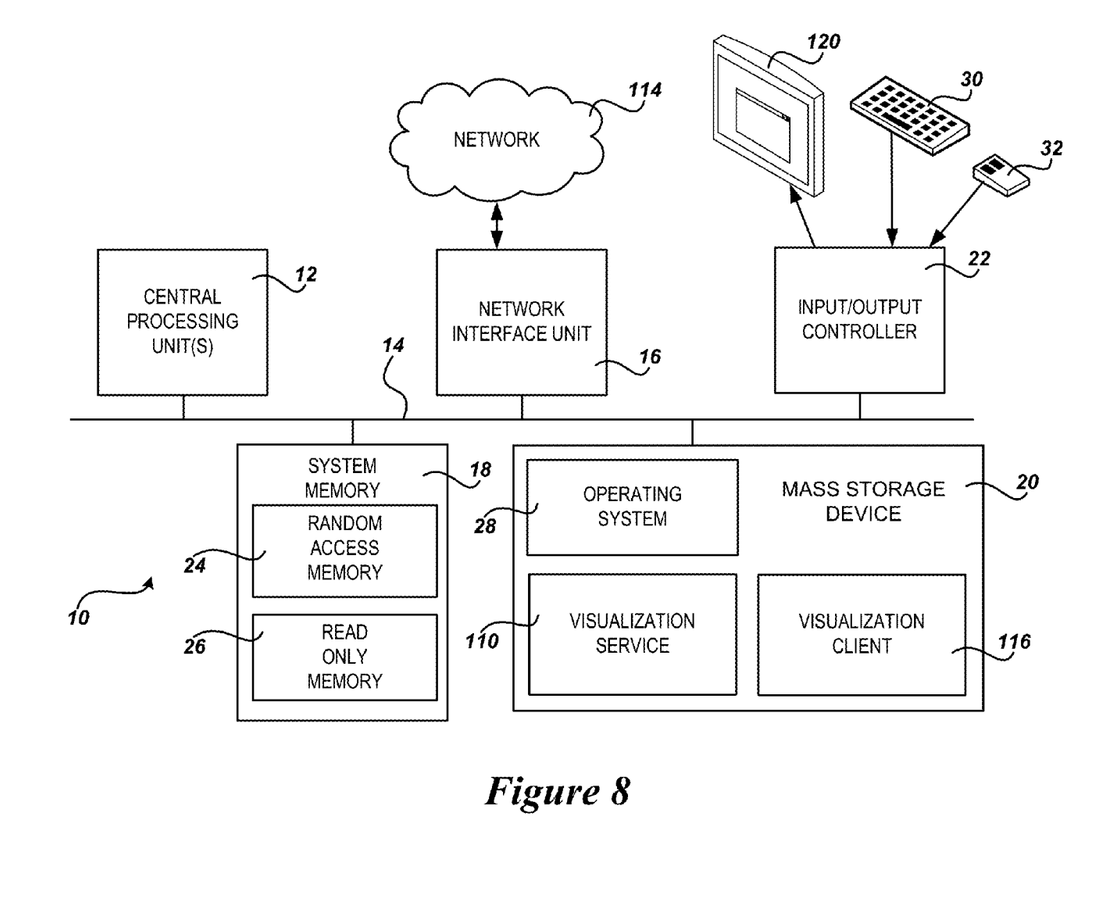
FIG. 8 is a block diagram showing an illustrative computer hardware and software architecture for a computing system capable of implementing aspects of the embodiments presented herein.

FIG. 8 shows an example computer architecture for a computer 10 capable of executing the software components described herein for transitioning between a top-down map display of a reconstructed structure within a 3-D scene and an associated local-navigation display, in the manner presented above. The computer architecture shown in FIG. 8 illustrates a conventional computing device, PDA, digital cellular phone, communication device, desktop computer, laptop, or server computer, and may be utilized to execute any aspects of the software components presented herein described as executing on the user computer 118, server computer 102, or other computing platform.

The computer architecture shown in FIG. 8 includes one or more central processing units ("CPUs") 12. The CPUs 12 may be standard central processors that perform the arithmetic and logical operations necessary for the operation of the computer 10. The CPUs 12 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 18, including a random access memory ("RAM") 24 and a read-only memory 26 ("ROM"), and a system bus 14 that couples the memory to the CPUs 12. A basic input/output system containing the basic routines that help to transfer information between elements within the computer 10, such as during startup, is stored in the ROM 26. The computer 10 also includes a mass storage device 20 for storing an operating system 28, application programs, and other program modules, which are described in greater detail herein.

The mass storage device 20 is connected to the CPUs 12 through a mass storage controller (not shown) connected to the bus 14. The mass storage device 20 provides non-volatile storage for the computer 10. The computer 10 may store information on the mass storage device 20 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 10 may store information to the mass storage device 20 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 10 may further read information from the mass storage device 20 by detecting the physical states or characteristics of one or more particular locations within the mass storage device.

As mentioned briefly above, a number of program modules and data files may be stored in the mass storage device 20 and RAM 24 of the computer 10, including an operating system 28 suitable for controlling the operation of a computer. The mass storage device 20 and RAM 24 may also store one or more program modules. In particular, the mass storage device 20 and the RAM 24 may store the visualization service 110 and visualization client 116, both of which were described in detail above in regard to FIG. 1. The mass storage device 20 and the RAM 24 may also store other types of program modules or data.

In addition to the mass storage device 20 described above, the computer 10 may have access to other computer-readable media to store and retrieve information, such as program modules, data structures, or other data. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 10.

The computer-readable storage medium may be encoded with computer-executable instructions that, when loaded into the computer 10, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 10 by specifying how the CPUs 12 transition between states, as described above. According to one embodiment, the computer 10 may have access to computer-readable storage media storing computer-executable instructions that, when executed by the computer, perform the routines 600 and 700 for transitioning between the top-down map display 302 display and the local-navigation display 204, described above in regard to FIGS. 6 and 7.

According to various embodiments, the computer 10 may operate in a networked environment using logical connections to remote computing devices and computer systems through a network 114. The computer 10 may connect to the network 114 through a network interface unit 16 connected to the bus 14. It should be appreciated that the network interface unit 16 may also be utilized to connect to other types of networks and remote computer systems.

The computer 10 may also include an input/output controller 22 for receiving and processing input from a number of input devices, including a keyboard 30, a mouse 32, a touchpad, a touch screen, an electronic stylus, or other type of input device. Similarly, the input/output controller 22 may provide output to a display device 120, such as a computer monitor, a flat-panel display, a digital projector, a printer, a plotter, or other type of output device. It will be appreciated that the computer 10 may not include all of the components shown in FIG. 8, may include other components that are not explicitly shown in FIG. 8, or may utilize an architecture completely different than that shown in FIG. 8.

Based on the foregoing, it should be appreciated that technologies for transitioning between a top-down map display of a reconstructed structure within a 3-D scene and an associated local-navigation display are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable storage device having computer-executable instructions stored thereupon which, when executed by one or more computers, cause the one or more computers to:
   generate a 3-D point cloud representing one of a structure or a scene computed from a collection of camera-acquired digital photographs by:
      locating recognizable features that appear in at least two or more digital photographs in the collection of digital photographs, and
      calculating positions of the recognizable features in space using a parameter of the recognizable features in the collection of digital photographs;
   display a top-down map display by projecting the positions of the recognizable features from the 3-D point cloud as points into an x-y plane;
   receive user input of a selected point in the x-y plane of the top-down map display; and
   provide an animated transition from the top-down map display to a local-navigation display showing a digital photograph from the collection of digital photographs, the digital photograph corresponding to the selected point displayed in the x-y plane of the top-down map display.

2. The computer-readable storage device of claim 1, wherein the animated transition is created by animating a view in a display window over a period of time while interpolating camera parameters from values representing a starting camera view to values representing an ending camera view.

3. The computer-readable storage device of claim 2, wherein the interpolation of the camera parameters is performed utilizing linear functions over the period of time.

4. The computer-readable storage device of claim 2, wherein the interpolation of the camera parameters is performed utilizing sigmoid-based functions over the period of time.

5. The computer-readable storage device of claim 2, wherein the starting camera view is associated with a currently-viewed digital photograph in the local-navigation display, the ending camera view is associated with the top-down map display, and interpolating the camera parameters comprises:
   interpolate camera position and orientation parameters of the starting camera view in a first stage from starting values associated with the currently-viewed digital photograph to ending values associated with the top-down map display; and
   interpolate a field-of-view parameter of the starting camera view in a second stage from a starting value associated with the currently-viewed digital photograph to an ending value associated with the top-down map display.

6. The computer-readable storage device of claim 2, wherein the starting camera view is associated with the top-down map display, the ending camera view is associated with a target digital photograph to be shown in the local-navigation display, and interpolating the camera parameters comprises:
   interpolate a roll parameter of the starting camera view in a first stage from a starting value associated with the top-down map display to an ending value reflecting a camera-up orientation of the top-down map display in regard to the target digital photograph;
   interpolate a field-of-view parameter of the starting camera view in a second stage from a starting value associated with the top-down map display to an ending value associated with the target digital photograph;
   interpolate camera position and orientation parameters of the starting camera view in a third stage from starting values associated with the top-down map display to ending values reflecting an interim camera position and orientation related to the target digital photograph; and
   interpolate camera position and orientation parameters of the starting camera view in a fourth stage from starting values reflecting the interim camera position and orientation to ending values associated with the target digital photograph.

7. The computer-readable storage device of claim 6, wherein the animated transition further comprises causing neighboring digital photographs to fade into view of the local-navigation display as the animated transition approaches the target digital photograph.

8. The computer-readable storage device of claim 2, wherein the starting camera view is associated with a currently-viewed digital photograph in the local-navigation display, the ending camera view is associated with a target digital photograph to be shown in the local-navigation display, and the animated transition comprises:

an animated transition from the currently-viewed digital photograph in the local-navigation display to the top-down map display; and an animated transition from the top-down map display to the target digital photograph in the local-navigation display.

9. A computer-implemented method comprising:

generating, by a computing device, a 3-D point cloud representing one of a structure or a scene computed from a collection of camera-acquired digital photographs by:

locating recognizable features that appear in at least two or more digital photographs in the collection of digital photographs, and calculating positions of the recognizable features in space using a parameter of the recognizable features in the collection of digital photographs;

displaying a top-down map display by projecting the positions of the recognizable features from the 3-D point cloud as points into an x-y plane;

receiving user input of a selected point in the x-y plane of the top-down map display; and providing, by the computing device, an animated transition from the top-down map display to a local-navigation display showing a digital photograph from the collection of digital photographs, the digital photograph corresponding to the selected point displayed in the x-y plane of the top-down map display, and the animated transition animating a view in a display window over a period of time while interpolating camera parameters from values representing a starting camera view to values representing an ending camera view.

10. The computer-implemented method of claim 9, wherein the interpolation of the camera parameters is performed utilizing linear functions over the period of time.

11. The computer-implemented method of claim 9, wherein the interpolation of the camera parameters is performed utilizing sigmoid-based functions over the period of time.

12. The computer-implemented method of claim 9, wherein the starting camera view is associated with a currently-viewed digital photograph in the local-navigation display, the ending camera view is associated with the top-down map display, and wherein interpolating the camera parameters comprises:

interpolating camera position and orientation parameters of the starting camera view in a first stage from starting values associated with the currently-viewed digital photograph to ending values associated with the top-down map display; and interpolating a field-of-view parameter of the starting camera view in a second stage from a starting value associated with the currently-viewed digital photograph to an ending value associated with the top-down map display.

13. The computer-implemented method of claim 9, wherein the starting camera view is associated with the top-down map display, the ending camera view is associated with a target digital photograph to be shown in the local-navigation display, and wherein interpolating the camera parameters comprises:

interpolating a roll parameter of the starting camera view in a first stage from a starting value associated with the top-down map display to an ending value reflecting a camera-up orientation of the top-down map display in regard to the target digital photograph;

interpolating a field-of-view parameter of the starting camera view in a second stage from a starting value associated with the top-down map display to an ending value associated with the target digital photograph;

interpolating camera position and orientation parameters of the starting camera view in a third stage from starting values associated with the top-down map display to ending values reflecting an interim camera position and orientation related to the target digital photograph; and interpolating camera position and orientation parameters of the starting camera view in a fourth stage from starting values reflecting the interim camera position and orientation to ending values associated with the target digital photograph.

14. A system comprising:

a user computer connected to a display device; and a visualization client executing on the user computer and configured to generate a 3-D point cloud representing one of a structure or a scene computed from a collection of camera-acquired digital photographs by:

locating recognizable features that appear in at least two or more digital photographs in the collection of digital photographs, and calculating positions of the recognizable features in space using a parameter of the recognizable features in the collection of digital photographs, display a top-down map display on the display device by projecting the positions of the recognizable features from the 3-D point cloud as points into an x-y plane, receive user input of a selected point in the x-y plane of the top-down map display, and provide an animated transition from the top-down map display to a local-navigation display showing a digital photograph from the collection of digital photographs, the digital photograph corresponding to the selected point displayed in the x-y plane of the top-down map display.

15. The system claim 14, wherein the animated transition is created by animating a view in a display window over a period of time while interpolating camera parameters from values representing a starting camera view to values representing an ending camera view, wherein the interpolation of the camera parameters is performed utilizing one or more of linear functions and sigmoid-based functions over the period of time.

16. The system claim 15, wherein the starting camera view is associated with a currently-viewed digital photograph in the local-navigation display, the ending camera view is associated with the top-down map display, and wherein interpolating the camera parameters comprises:

interpolating camera position and orientation parameters of the starting camera view in a first stage from starting values associated with the currently-viewed digital photograph to ending values associated with the top-down map display; and interpolating a field-of-view parameter of the starting camera view in a second stage from a starting value associated with the currently-viewed digital photograph to an ending value associated with the top-down map display.

17. The system claim 15, wherein the starting camera view is associated with the top-down map display, the ending camera view is associated with a target digital photograph to be shown in the local-navigation display, and wherein interpolating the camera parameters comprises:

interpolating a roll parameter of the starting camera view in a first stage from a starting value associated with the top-down map display to an ending value reflecting a camera-up orientation of the top-down map display in regard to the target digital photograph;

interpolating a field-of-view parameter of the starting camera view in a second stage from a starting value associated with the top-down map display to an ending value associated with the target digital photograph;

interpolating camera position and orientation parameters of the starting camera view in a third stage from starting values associated with the top-down map display to ending values reflecting an interim camera position and orientation related to the target digital photograph; and interpolating camera position and orientation parameters of the starting camera view in a fourth stage from starting values reflecting the interim camera position and orientation to ending values associated with the target digital photograph.

18. The computer-readable storage device of claim 1, wherein the parameter of the recognizable features in the collection of digital photographs comprises one of a location, a perspective, a visibility or an obscurity of the recognizable features in the collection of digital photographs.

19. The computer-implemented method of claim 9, wherein the parameter of the recognizable features in the collection of digital photographs comprises one of a location, a perspective, a visibility or an obscurity of the recognizable features in the collection of digital photographs.

20. The system claim 14, wherein the parameter of the recognizable features in the collection of digital photographs comprises one of a location, a perspective, a visibility or an obscurity of the recognizable features in the collection of digital photographs.

* * * * *